(12) United States Patent
Johnson et al.

(10) Patent No.: US 11,078,019 B2
(45) Date of Patent: Aug. 3, 2021

(54) TOTE INDUCTION IN WAREHOUSE ORDER FULFILLMENT OPERATIONS

(71) Applicant: Locus Robotics Corp., Wilmington, MA (US)

(72) Inventors: Michael Charles Johnson, Ashland, MA (US); Bruce Welty, Boston, MA (US); Sean Johnson, Danvers, MA (US); Luis Jaquez, Burlington, MA (US)

(73) Assignee: Locus Robotics Corp., Wilmington, MA (US)

( * ) Notice: Subject to any disclaimer, the term of this patent is extended or adjusted under 35 U.S.C. 154(b) by 60 days.

(21) Appl. No.: 16/262,315

(22) Filed: Jan. 30, 2019

(65) Prior Publication Data
US 2020/0239232 A1    Jul. 30, 2020

(51) Int. Cl.
| | |
|---|---|
| *B65G 1/137* | (2006.01) |
| *G06Q 10/08* | (2012.01) |
| *B25J 5/00* | (2006.01) |
| *B25J 9/16* | (2006.01) |
| *B65G 1/04* | (2006.01) |
| *G05D 1/02* | (2020.01) |
| *G05B 19/418* | (2006.01) |

(52) U.S. Cl.
CPC ............ *B65G 1/1373* (2013.01); *B25J 5/007* (2013.01); *B25J 9/1679* (2013.01); *B65G 1/0492* (2013.01); *G05B 19/41895* (2013.01); *G05D 1/0287* (2013.01); *G05D 1/0291* (2013.01); *G06Q 10/08* (2013.01); *B65G 2209/04* (2013.01); *G05D 2201/0216* (2013.01); *Y10S 901/01* (2013.01)

(58) Field of Classification Search
CPC ..................... B65G 1/1373; G05B 19/41895
See application file for complete search history.

(56) References Cited

U.S. PATENT DOCUMENTS

| | | |
|---|---|---|
| 8,326,679 B1 | 12/2012 | Rowe |
| 8,983,647 B1 | 3/2015 | Dwarakanath |
| (Continued) | | |

FOREIGN PATENT DOCUMENTS

| | | |
|---|---|---|
| WO | WO 2018/132793 A1 | 7/2018 |

OTHER PUBLICATIONS

International Searching Authority/EP, International Search Report and Written Opinion of the International Searching Authority, Application No. PCT/US2020/016055, dated Mar. 30, 2020, 13 pages.

(Continued)

*Primary Examiner* — Thomas Randazzo
(74) *Attorney, Agent, or Firm* — Sunstein LLP

(57) ABSTRACT

A method for assigning orders to a plurality of robots fulfilling orders in a warehouse with the assistance of a plurality of operators. The method includes providing a first robot of the plurality of robots to a be assigned an order set, including one or more orders to be fulfilled and assessing the locations of at least one of the plurality of robots or at least one of the plurality of operators in the warehouse. The method also includes selecting an anchor location in the warehouse and generating an order set for the first robot correlated to the anchor location in the warehouse. The method also includes assigning the order set to the first robot for fulfillment.

16 Claims, 22 Drawing Sheets

(56) References Cited

U.S. PATENT DOCUMENTS

| | | | |
|---|---|---|---|
| 9,346,620 | B2 | 5/2016 | Brunner et al. |
| 9,463,927 | B1* | 10/2016 | Theobald ............. B65G 1/1373 |
| 9,776,324 | B1 | 10/2017 | Johnson et al. |
| 9,829,333 | B1 | 11/2017 | Calder |
| 10,022,867 | B2 | 7/2018 | Saboo et al. |
| 10,296,995 | B2 | 5/2019 | Saboo et al. |
| 10,414,052 | B2 | 9/2019 | Deyle et al. |
| 10,513,033 | B2 | 12/2019 | Johnson et al. |
| 10,562,707 | B1* | 2/2020 | Wise .................... G05D 1/0297 |
| 2005/0216294 | A1 | 9/2005 | Labow |
| 2007/0192910 | A1 | 8/2007 | Vu et al. |
| 2008/0215179 | A1 | 9/2008 | Yair |
| 2010/0296908 | A1 | 11/2010 | Ko |
| 2011/0200420 | A1 | 8/2011 | Driskill et al. |
| 2012/0152877 | A1 | 6/2012 | Tadayon |
| 2012/0330458 | A1 | 12/2012 | Weiss |
| 2013/0317642 | A1* | 11/2013 | Asaria ................... G06Q 10/08 700/216 |
| 2014/0100715 | A1* | 4/2014 | Mountz ............... G06Q 10/087 701/2 |
| 2014/0136255 | A1* | 5/2014 | Grabovski ..... G06Q 10/063112 705/7.14 |
| 2015/0088310 | A1 | 3/2015 | Pinter et al. |
| 2015/0360865 | A1 | 12/2015 | Massey |
| 2015/0367513 | A1 | 12/2015 | Gettings et al. |
| 2016/0101940 | A1* | 4/2016 | Grinnell ............... G05D 1/0297 700/216 |
| 2017/0032306 | A1 | 2/2017 | Johnson et al. |
| 2017/0278047 | A1* | 9/2017 | Welty .................... G05D 1/0011 |
| 2017/0285648 | A1 | 10/2017 | Welty et al. |
| 2017/0286916 | A1 | 10/2017 | Skiba et al. |
| 2018/0029797 | A1* | 2/2018 | Hance .................. B65G 1/1373 |
| 2018/0043533 | A1* | 2/2018 | Johnson ............... G05D 1/0297 |
| 2018/0059635 | A1* | 3/2018 | Johnson .................. B25J 5/007 |
| 2018/0108102 | A1* | 4/2018 | Kapuria ................. G06Q 50/28 |
| 2018/0130015 | A1 | 5/2018 | Jones |
| 2018/0201444 | A1* | 7/2018 | Welty .................... B65G 1/0492 |
| 2018/0239343 | A1 | 8/2018 | Voorhies et al. |
| 2018/0300798 | A1* | 10/2018 | Rajkhowa ............ G06Q 10/083 |
| 2018/0370728 | A1* | 12/2018 | Gallagher ................ B25J 5/007 |
| 2019/0138978 | A1 | 5/2019 | Johnson et al. |
| 2020/0033867 | A1 | 1/2020 | Grant et al. |
| 2020/0061839 | A1 | 2/2020 | Deyle et al. |
| 2020/0202285 | A1* | 6/2020 | Elazary ................ B65G 1/1375 |
| 2020/0239231 | A1 | 7/2020 | Johnson et al. |
| 2020/0246972 | A1 | 8/2020 | Johnson et al. |
| 2020/0246978 | A1 | 8/2020 | Johnson et al. |
| 2020/0275984 | A1 | 9/2020 | Brisson et al. |
| 2020/0278667 | A1* | 9/2020 | Voorhies .......... G05B 19/41895 |

OTHER PUBLICATIONS

International Searching Authority/EP, International Search Report and Written Opinion of the International Searching, Authority, Application No. PCT/US2020/016193, dated Mar. 31, 2020, 11 pages.

International Searching Authority, EP, International Search Report and Written Opinion of the International Searching Authority, Application No. PCT/US2020/015811, dated Apr. 1, 2020, 11 pages.

Adam Rule et al. *Designing Interfaces for Multi-User, Multi-Robot Systems*, 2012, IEEE, pp. 97-104.

Masahiro Shiomi et al., *Field Trial of Networked Social Robots in a Shopping Mall*, The 2009 IEEE/RSJ International Conference on Intelligent Robots and Systems, pp. 2846-2853.

Stephen Hughes et al., *Camera Orientation: An Opportunity for Human-Robot Collaborative Control*, 2005, IEEE, pp. 1-6.

Boris Trouvain et al., *Comparison of a Map- vs. Camera-based User Interface in a Multi-Robot Navigation Task*, 2003, IEEE, pp. 3224-3231.

International Search Report with Written Opinion, dated Mar. 27, 2020, received in international patent application No. PCT/US20/15793, 11 pages.

International Search Report with Written Opinion, dated Apr. 29, 2020, received in international patent application No. PCT/US2020/015840, 12 pages.

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

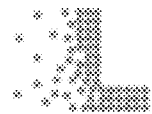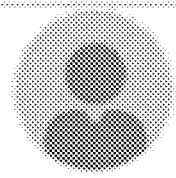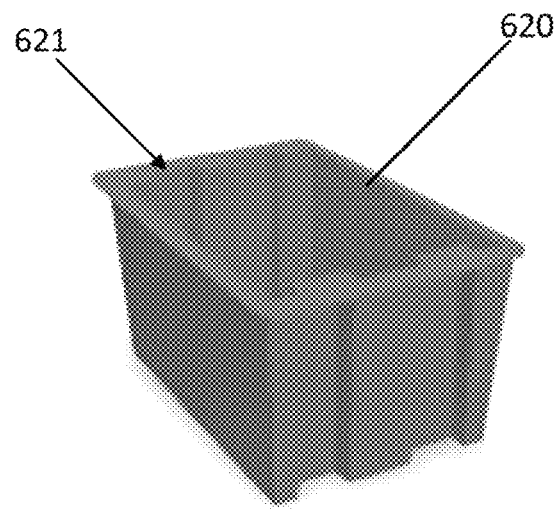
Fig. 10A
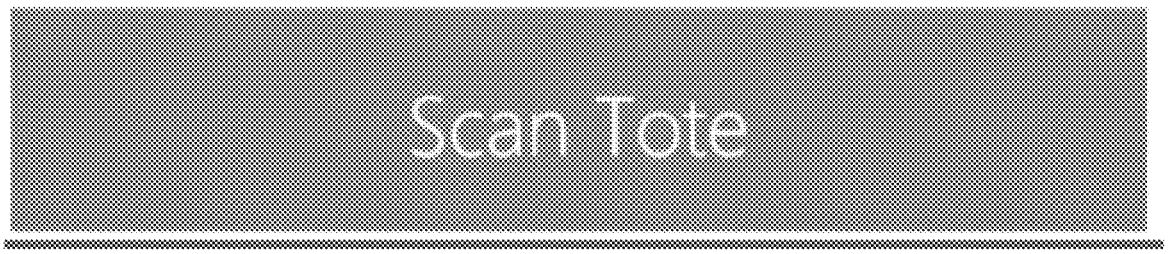

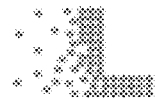 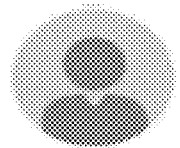
Induct Tote
2 Position Array
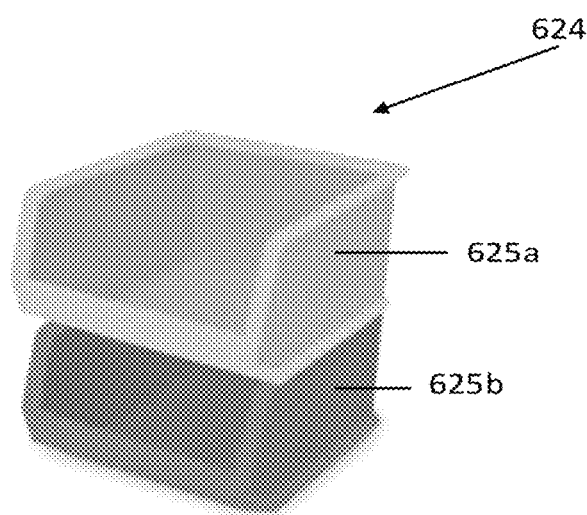
624
625a
625b
Fig 10C
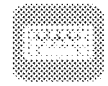
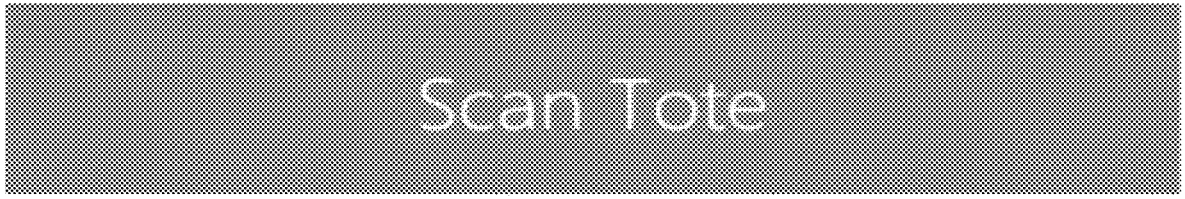

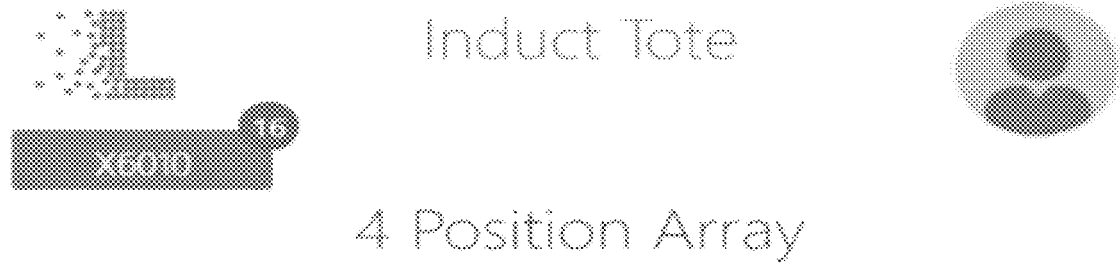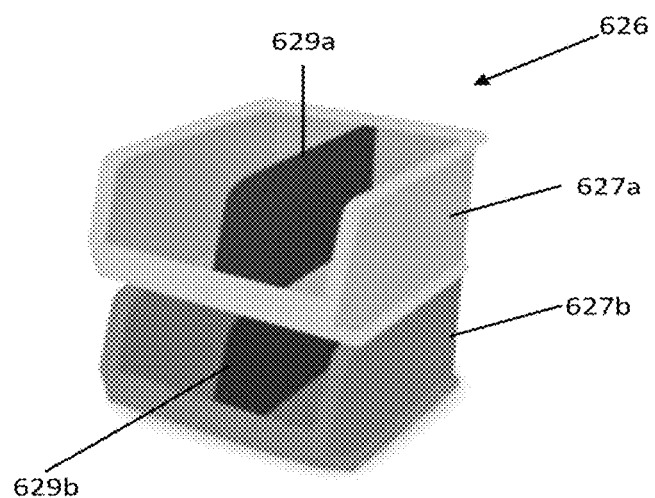
Fig. 10D
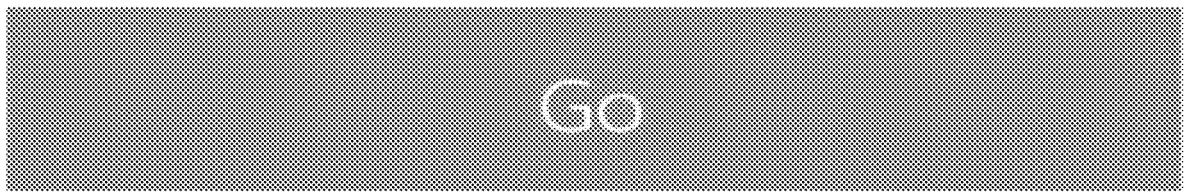

650

| Tote Number | Tote Type | Dimensions | Volume |
|---|---|---|---|
| 1 | Single | $H_1*W_1*L_1$ | $V_1$ |
| 2 | Two Compartment | $H_2*W_2*L_2$ | $V_2$ |
| 3 | Three Compartment | $H_3*W_3*L_3$ | $V_3$ |
| 4 | Four Compartment | $H_4*W_4*L_4$ | $V_4$ |
| 5 | Six Compartment | $H_5*W_5*L_5$ | $V_5$ |

| Order | X1 | Y1 | X2 | Y2 | X3 | Y3 | Score | Dimensions H*W*L | Volume V |
|---|---|---|---|---|---|---|---|---|---|
| 107387736 | 57.56 | 37.23 | 57.38 | 68.52 | 73.90 | 57.88 | 5 | ... | ... |
| 107387878 | 54.83 | 45.06 | 57.36 | 66.47 | 73.44 | 58.20 | 11 | | |
| 107385221 | 65.31 | 25.35 | 57.38 | 68.52 | 73.09 | 57.25 | 15 | | |
| 107387014 | 62.63 | 33.17 | 60.00 | 61.80 | 73.14 | 54.54 | 16 | | |
| 107387660 | 63.51 | 55.52 | 57.38 | 66.52 | 75.67 | 55.62 | 22 | | |
| 107388420 | 62.63 | 40.43 | 63.74 | 55.32 | 74.66 | 57.34 | 22 | | |
| 107387703 | 60.24 | 25.32 | 57.38 | 68.52 | 78.14 | 66.81 | 24 | | |
| 107387580 | 60.14 | 32.02 | 62.63 | 40.98 | 74.27 | 70.46 | 47 | | |
| 107388362 | 60.24 | 25.32 | 75.76 | 49.61 | 69.14 | 71.72 | 53 | | |
| 107387151 | 78.39 | 32.15 | 73.20 | 47.77 | 60.88 | 58.21 | 54 | | |
| 107387889 | 70.88 | 27.98 | 70.61 | 48.85 | 79.40 | 70.45 | 54 | | |
| 107387430 | 66.77 | 25.35 | 80.93 | 52.23 | 74.30 | 70.42 | 57 | | |
| 107387820 | 80.90 | 42.53 | 67.98 | 54.08 | 72.96 | 73.81 | 58 | | |
| 107388083 | 80.93 | 25.34 | 73.19 | 48.85 | 80.88 | 58.21 | 58 | | |
| 107387587 | 78.59 | 34.72 | 70.61 | 45.15 | 80.75 | 67.09 | 59 | | |
| 107388105 | 78.29 | 20.14 | 77.06 | 45.69 | 73.25 | 60.81 | 59 | | |
| 107387953 | 78.30 | 58.20 | 70.34 | 79.02 | 80.59 | 77.57 | 67 | | |
| 107387832 | 56.07 | 67.22 | 73.13 | 43.09 | 80.48 | 67.06 | 70 | | |
| 107388500 | 62.78 | 20.13 | 67.90 | 43.83 | 80.32 | 85.97 | 74 | | |
| 107388185 | 62.76 | 21.61 | 86.55 | 34.46 | 75.87 | 22.74 | 86 | | |
| 107388224 | 63.62 | 40.98 | 70.86 | 27.98 | 0.00 | 0.00 | 145 | | |
| 107387094 | 75.84 | 29.49 | 0.00 | 0.00 | 0.00 | 0.00 | 203 | | |
| 107387094 | 75.76 | 20.14 | 0.00 | 0.00 | 0.00 | 0.00 | 208 | | |
| 107388430 | 80.64 | 73.10 | 0.00 | 0.00 | 0.00 | 0.00 | 226 | | |

TOTE INDUCTION IN WAREHOUSE ORDER FULFILLMENT OPERATIONS

CROSS-REFERENCE TO RELATED APPLICATION(S)

This application is related to U.S. patent application Ser. No. 16/262,379, titled OPTIMIZED TOTE RECOMMENDATION PROCESS IN WAREHOUSE ORDER FULFILLMENT OPERATIONS, filed concurrently with this application, incorporated herein by reference.

FIELD OF THE INVENTION

This invention relates to tote induction in warehouse order fulfillment operations and more specifically to such tote induction wherein the tote type is selected based on a characteristic of the order set being assigned.

BACKGROUND OF THE INVENTION

Order fulfillment is typically performed in a large warehouse filled with products to be shipped to customers who have placed their orders over the internet for home delivery. In some operations, robots may be used to assist humans in item retrieval in order to increase productivity and efficiency. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

A warehouse management system (WMS) is a software application that supports the day-to-day operations in an order fulfillment warehouse like the one described above. WMS programs enable centralized management of tasks, such as tracking inventory levels and stock locations. Warehouse management systems also support or direct all of the major and many minor warehouse tasks such as receiving, inspection and acceptance, put-away, internal replenishment to picking positions, picking, packing, order assembly on the shipping dock, documentation, and shipping (loading onto carrier vehicles).

The WMS typically receives orders from the overlying host system, usually an ERP system. For order fulfillment via E-Commerce orders, as soon as a customer places an order online, the information is passed along via the host computer/ERP system to the WMS. All necessary steps to manage the order (e.g. pick the ordered items etc.) are then processed within the WMS. Afterwards, information is sent back to the ERP system to support financial transactions, advance shipping notifications to customers, inventory management, etc.

As the orders from the WMS accrue they are held in an order queue in the WMS or order data from the WMS may be provided to a separate software system (e.g. an order server) wherein an order queue can be established and distributed to robots to execute the orders within the warehouse. The orders may be taken in sequence from the order queue in the order they arrived and assigned to robots to execute the orders in a process known as induction. The orders may also be arranged in the order queue and assigned according to service level requirements defined in the customer contracts or based on customer shipping requirements. The individual robots may carry tote arrays which allow a single robot to execute multiple orders, one order stored in each bin or compartment of the array.

As the orders are grouped and assigned to the robot being inducted, a human operator at an induction station may be required to select a tote/tote array that is suitable for the orders assigned to the robots. In this process, there is room for error and inefficiencies in that a tote with the wrong number of compartments or of a size which will not fit the items in the orders may be selected by the operator and placed on the robot. Or, the selected tote may not be optimized for the set of orders in the order queue. This will result in issues that will need to be corrected during the picking process. Therefore, there exists a need for optimizing the selection of totes/tote arrays based on the order sets being assigned to robots in the induction process.

In addition, as the orders are grouped and assigned to the robot being inducted, if the items in the orders are in locations within the warehouse where there is not a lot of robot/operator activity, the robots may sit idle for extended periods before they are serviced. This may also result in a reduction efficiency in warehouse operations.

BRIEF SUMMARY OF THE INVENTION

The benefits and advantages of the present invention over existing systems will be readily apparent from the Brief Summary of the Invention and Detailed Description to follow. One skilled in the art will appreciate that the present teachings can be practiced with embodiments other than those summarized or disclosed below.

In one aspect the invention features a method for assigning orders to a plurality of robots fulfilling orders in a warehouse with the assistance of a plurality of operators, each order including one or more items and each item stored at a location in the warehouse. The method includes providing a first robot of the plurality of robots to a be assigned an order set, including one or more orders to be fulfilled and selecting an anchor location in the warehouse. The method also includes generating an order set for the first robot, the order set being correlated to the anchor location in the warehouse and assigning the order set to the first robot for fulfillment.

In other aspects of the invention one or more of the following features may be included. The step of providing the first robot may include positioning the first robot at a processing station where an operator assists with assigning orders to the first robot. The operator may provide the first robot with a tote array for carrying the items in the order set when the first robot fulfills the order set in the warehouse. The first robot may fulfill the order set in the warehouse by travelling to locations in the warehouse associated with each item in the order set and communicating to an operator proximate each location the item to be selected and placed on the tote array of the first robot. The step of selecting the anchor location may include assessing the locations of one or more of the plurality of robots, the plurality of operators, or a plurality of active locations in the warehouse and it may include identifying one or more groups of the plurality of robots, the plurality of operators, and/or the plurality of active locations which are proximate each other in the warehouse. Each of the plurality of active locations may be a location associated with an item in an order that has been assigned to one of the plurality of robots for fulfillment. The step of identifying one or more groups of the plurality of robots, the plurality of operators, and/or the plurality of active locations which are proximate each other in the warehouse may include selecting a group and identifying one of the robots, operators, or active locations in the selected group as the anchor robot, anchor operator or anchor active location and using the location of the selected anchor robot, anchor operator or anchor active location as the anchor location. The step of selecting the group may include selecting the group based on the number of robots, operators, and/or active locations. The step of selecting the group may include selecting the group based on a ratio of one of robots, operators, and active locations to another of robots, operators, and active locations. The step of generating an order set may include selecting orders based in part on proximity of the orders to the anchor location.

In another aspect, the invention features a system for assigning orders to a plurality of robots fulfilling orders in a warehouse with the assistance of a plurality of operators, each order including one or more items and each item stored at a location in the warehouse. The system includes a first robot of the plurality of robots to be assigned an order set, including one or more orders to be fulfilled and a warehouse management system configured to select an anchor location in the warehouse. The warehouse management system is also configured to generate an order set for the first robot, the order set being correlated to the anchor location in the warehouse and assign the order set to the first robot for fulfillment.

In further aspects of the invention one or more of the following features may be included. There may further be included a processing station where an operator assists with assigning orders to the first robot. The operator may provide the first robot with a tote array for carrying the items in the order set when the first robot fulfills the order set in the warehouse. The first robot may be configured to fulfill the order set in the warehouse by travelling to locations in the warehouse associated with each item in the order set and communicating to an operator proximate each location the item to be selected and placed on the tote array of the first robot. In carrying out the step of selecting the anchor location the warehouse management system may be configured to assess the locations of one or more of the plurality of robots, the plurality of operators, or a plurality of active locations in the warehouse and to identify one or more groups of the plurality of robots, the plurality of operators, and/or the plurality of active locations which are proximate each other in the warehouse. Each of the plurality of active locations may be a location associated with an item in an order that has been assigned to one of the plurality of robots for fulfillment. In carrying out the step of identifying one or more groups of the plurality of robots, the plurality of operators, and/or the plurality of active locations which are proximate each other in the warehouse, the warehouse management system may be configured select a group and identify one of the robots, operators, or active locations in the selected group as the anchor robot, anchor operator or anchor active location and using the location of the selected anchor robot, anchor operator or anchor active location as the anchor location. In carrying out the step of selecting the group the warehouse management system may be configured to select the group based on the number of robots, operators, and/or active locations. In carrying out the step of selecting the group the warehouse management system may be configured to select the group based on a ratio of one of robots, operators, and active locations to another of robots, operators, and active locations. In carrying out the step of generating an order set the warehouse management system may be configured to select orders based in part on proximity of the orders to the anchor location.

These and other features of the invention will be apparent from the following detailed description and the accompanying figures.

BRIEF DESCRIPTION OF THE FIGURES

Embodiments of the present invention will now be described, by way of example only, with reference to the attached Figures, wherein:

FIG. 6 is a table of the fiducial identification to pose mapping;

FIG. 7 is a table of the bin location to fiducial identification mapping;

FIG. 10A is a display of a single tote displayed on the operator display screen;

FIG. 10C is a display of two position tote array displayed on the operator display screen;

FIG. 10D is a display of four position tote array displayed on the operator display screen;

FIG. 11 is a table depicting different tote/tote array types available and information about dimensions, volume and weight tote/tote array types;

FIG. 14 is a table depicting a portion of an order queue according to an aspect of this invention including information about dimensions, volume and weight of the items in the order(s);

DETAILED DESCRIPTION OF INVENTION

Figure 1:
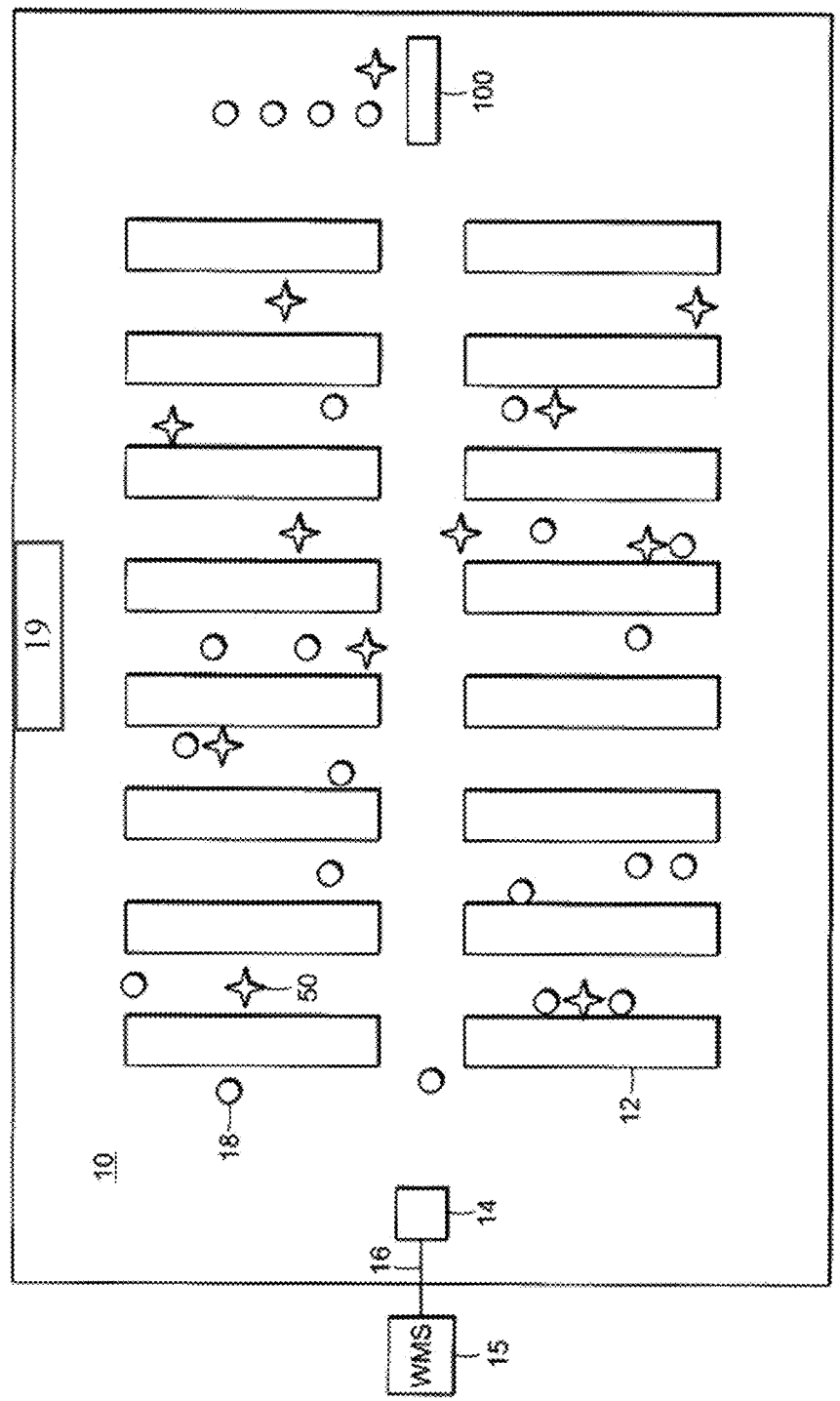
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The disclosure is directed to a tote induction process which may be applied to an order fulfillment operation in a warehouse using autonomous mobile robots or "AMRs" in order to increase efficiency and productivity. In the application described, the robots are assisted by human operators to more efficiently perform the picking and placing of items, but the disclosure is equally applicable to robots having articulated arms to perform the picking and placing operations. Moreover, a specific AMR implementation is described herein, but it is only to provide context for the induction process according to this invention. Any applicable robot design/system may be used in conjunction with the induction process described herein.

Referring to FIG. 1, a typical order-fulfillment warehouse 10 includes shelves 12 filled with the various items that could be included in an order. In operation, an incoming stream of orders 16 from warehouse management server 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18, e.g. wirelessly, for execution. The induction process according to an aspect of this invention will be described in more detail below.

It will be understood by those skilled in the art that order server 14 may be a separate server with a discrete software system configured to interoperate with the WMS server 15 and WMS software or the order server functionality may be integrated into the WMS software and run on the WMS server 15.

Figure 2A:
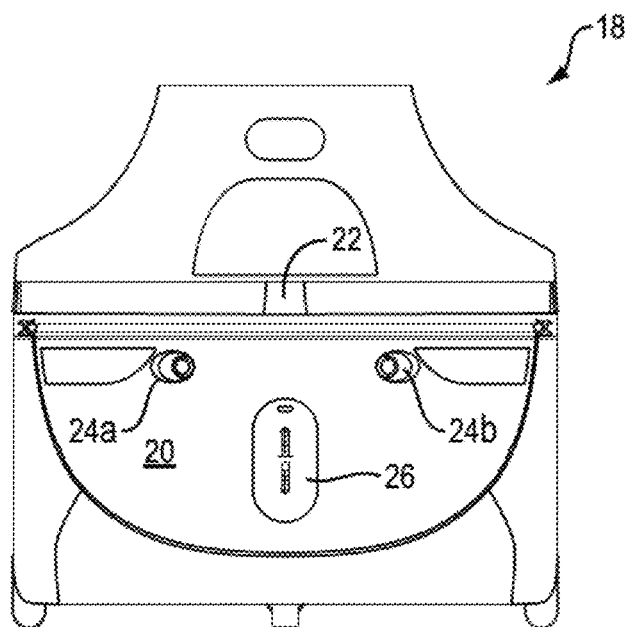
FIG. 2A is a front elevational view of a base of one of the robots used in the warehouse shown in FIG. 1.
Figure 2B:
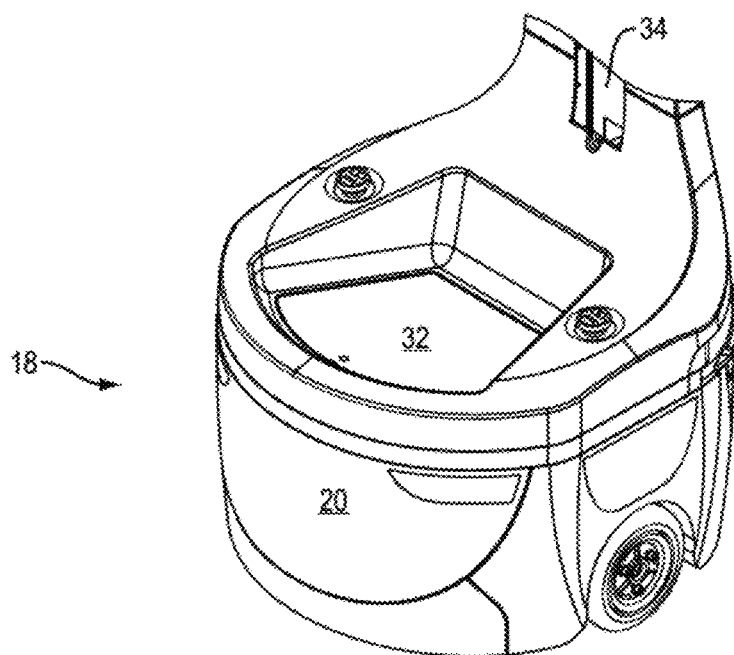
FIG. 2B is a perspective view of a base of one of the robots used in the warehouse shown in FIG. 1.
Figure 3:
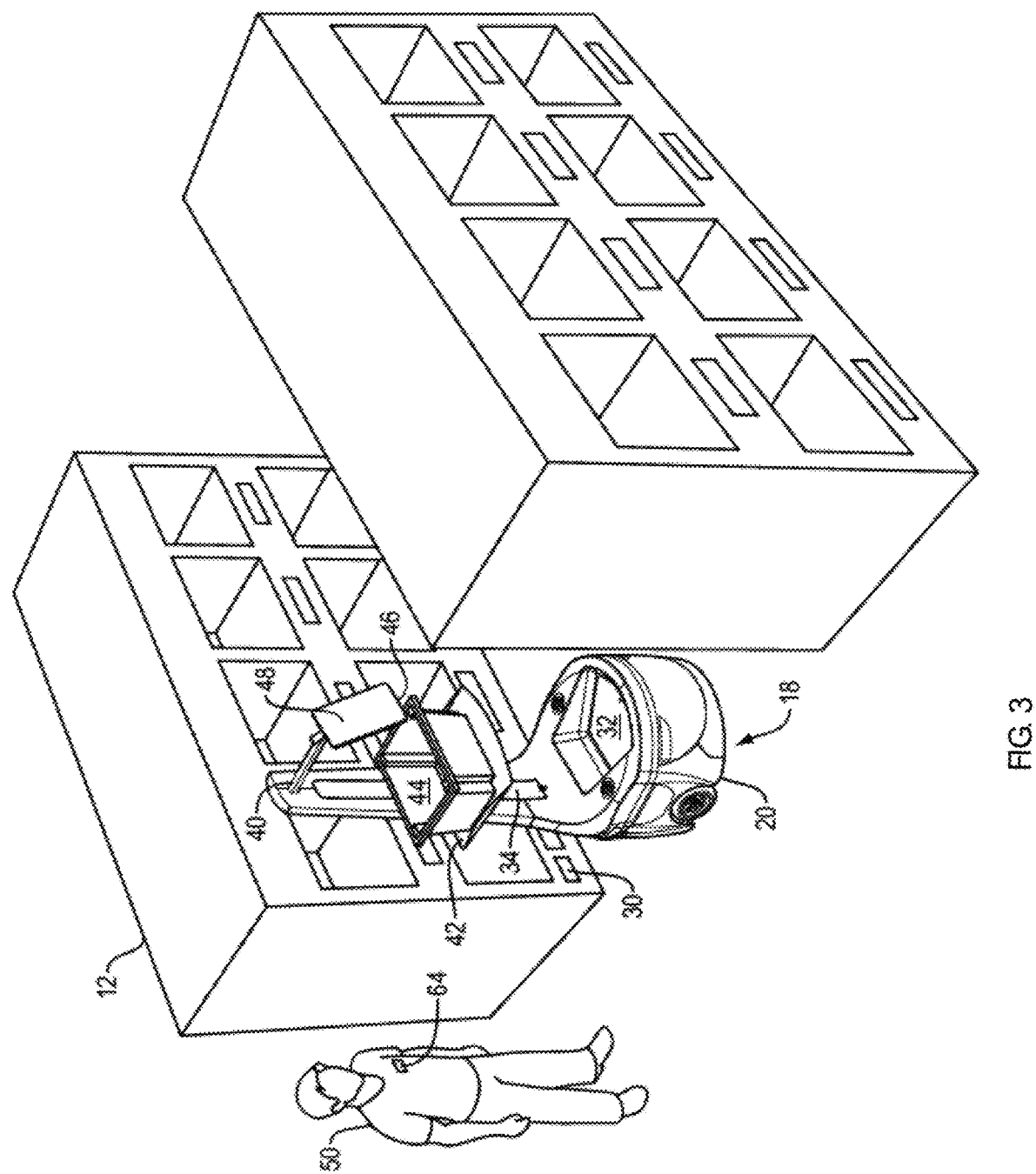
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for recharging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8.

Fiducial markers are also used to identify processing stations (including induction stations) and the navigation to such processing station fiducial markers may be the same as the navigation to the bin/location of items ordered. It should be noted that the navigation approach described herein is only exemplary and any other applicable navigation approach may be used.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not adept enough to quickly and efficiently pick items from a shelf and place them in the tote 44. Currently, a more efficient way of picking items is to use a local operator 50, which is typically human, to carry out the task of physically removing an ordered item from a shelf 12 and placing it on robot 18, for example, in tote 44. The robot 18 communicates the order (i.e. the individual item(s) to select) to the local operator 50 via the tablet 48 (or laptop/other user input/output device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored, communicates the item information to the local operator 50, and waits for a local operator 50 to retrieve the item from the shelf 12 and place it in tote 44. If robot 18 has other items to retrieve, it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8. It should be noted that this is an exemplary navigation approached described herein and that any suitable navigation approach may be used in conjunction with the induction process described herein.

Using one or more robots 18, a map of the warehouse 10 must be created and dynamically updated to determine the location of objects, both static and dynamic, as well as the locations of various fiducial markers dispersed throughout the warehouse. One or more of the robots 18 navigate the warehouse and build/update a map 10a, FIG. 4, utilizing its laser-radar 22 and simultaneous localization and mapping (SLAM), which is a computational method of constructing or updating a virtual map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create/update map 10a of warehouse 10 as robot 18 travels throughout the space identifying open space 112, walls 114, objects 116, and other static obstacles such as shelves 12a in the space, based on the reflections it receives as the laser-radar scans the environment.

Figure 4:
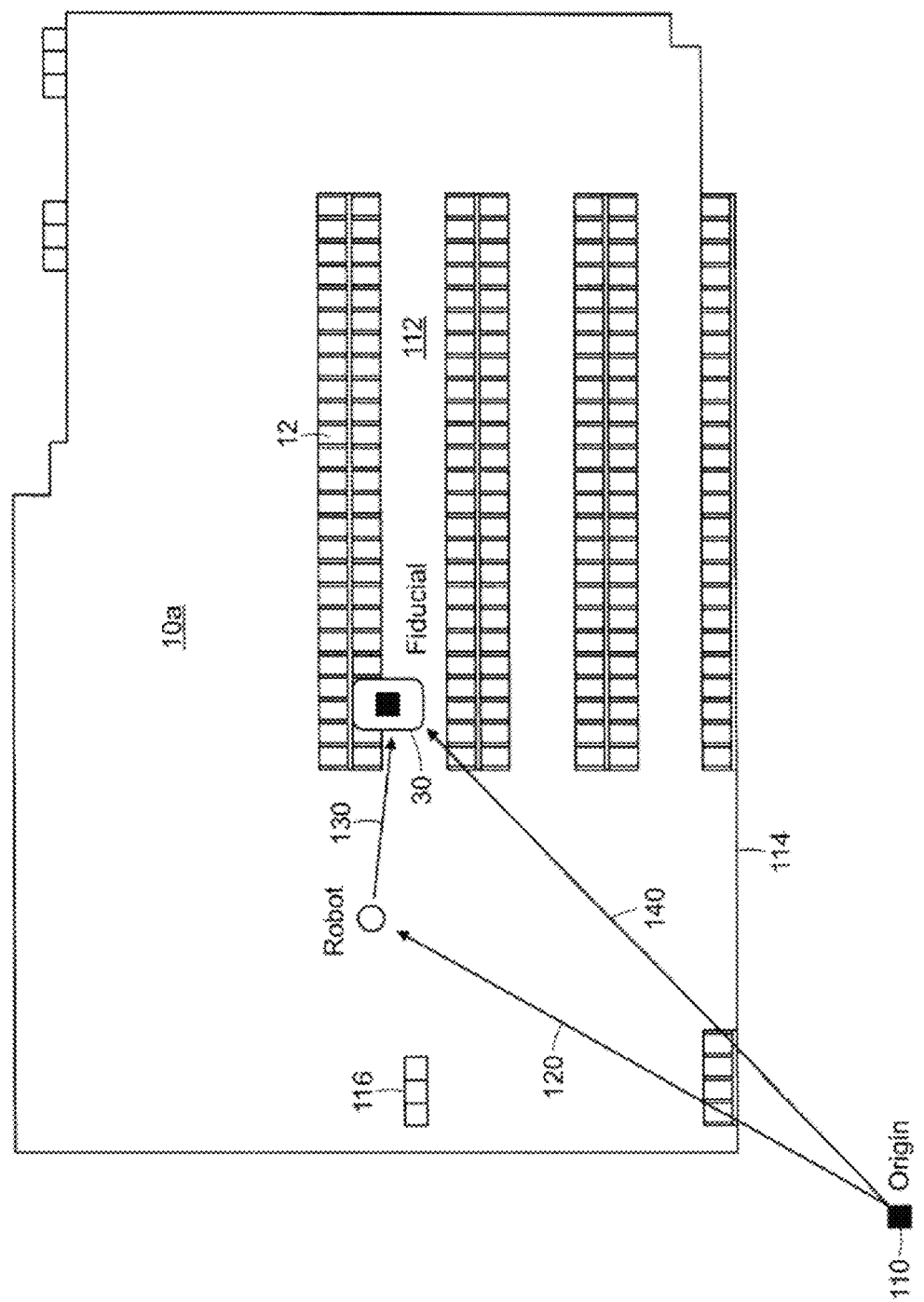
FIG. 4 is a partial map of the warehouse of FIG. 1 created using laser radar on the robot.

While constructing the map 10a or thereafter, one or more robots 18 navigates through warehouse 10 using cameras 24a and 24b to scan the environment to locate fiducial markers (two-dimensional bar codes) dispersed throughout the warehouse on shelves proximate bins, such as 32 and 34, FIG. 3, in which items are stored. Robots 18 use a known reference point or origin for reference, such as origin 110. When a fiducial marker, such as fiducial marker 30, FIGS. 3 and 4, is located by robot 18 using its cameras 24a and 24b, the location in the warehouse relative to origin 110 is determined. By using two cameras, one on either side of robot base, as shown in FIG. 2A, the robot 18 can have a relatively wide field of view (e.g. 120 degrees) extending out from both sides of the robot. This enables the robot to see, for example, fiducial markers on both sides of it as it travels up and down aisles of shelving.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose, which comprises its position (x, y, z coordinates) in the warehouse along with its orientation or quaternion (x, y, z, w) for fiducial marker 30 can be determined. It should be noted that the coordinates may only include x and y coordinates as the fiducial pose is typically located on the floor and thus the z coordinate is zero.

Figure 5:
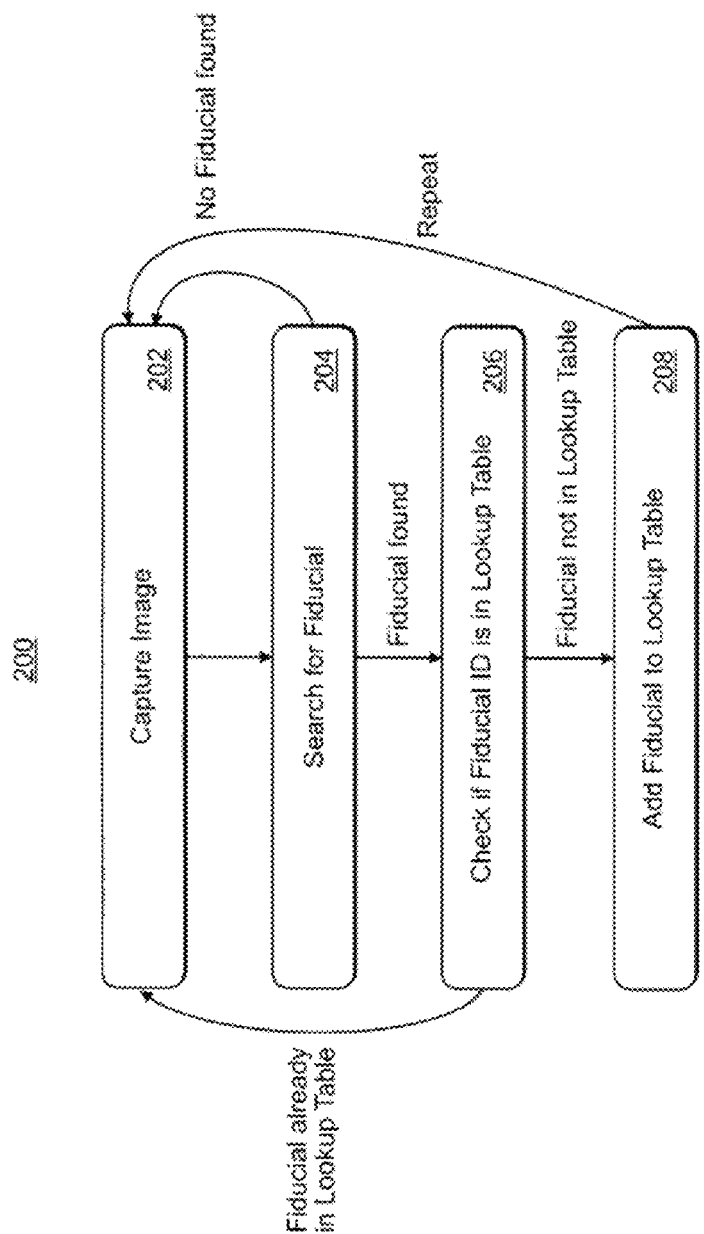
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using cameras 24a and 24b captures an image and in step 204 searches for fiducial markers within the captured images. In step 206, if a fiducial marker is found in the image (step 204) it is determined if the fiducial marker is already stored in fiducial table 300, FIG. 6, which may be located in memory 34 of robot 18 and/or in the warehouse management system 15. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot and/or in the warehouse management system 15, there are included for each fiducial marker, a fiducial identification, 1, 2, 3, etc., and a pose for the fiducial marker/bar code associated with each fiducial identification. As indicated above, the pose consists of the x,y,z coordinates in the warehouse along with the orientation or the quaternion (x,y,z,ω).

In another look-up Table 400, FIG. 7, which may also be stored in the memory of each robot and/or in the warehouse management system 15, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker. Charging stations located in charging area 19 and processing station 100, FIG. 1, may also be stored in table 400 and correlated to fiducial IDs. From the fiducial IDs, the poses of the charging station and processing station may be found in table 300, FIG. 6.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, robot 18 can determine the pose of the fiducial ID using the information in table 300, FIG. 6, and then navigate to the pose as described herein.

Figure 8:
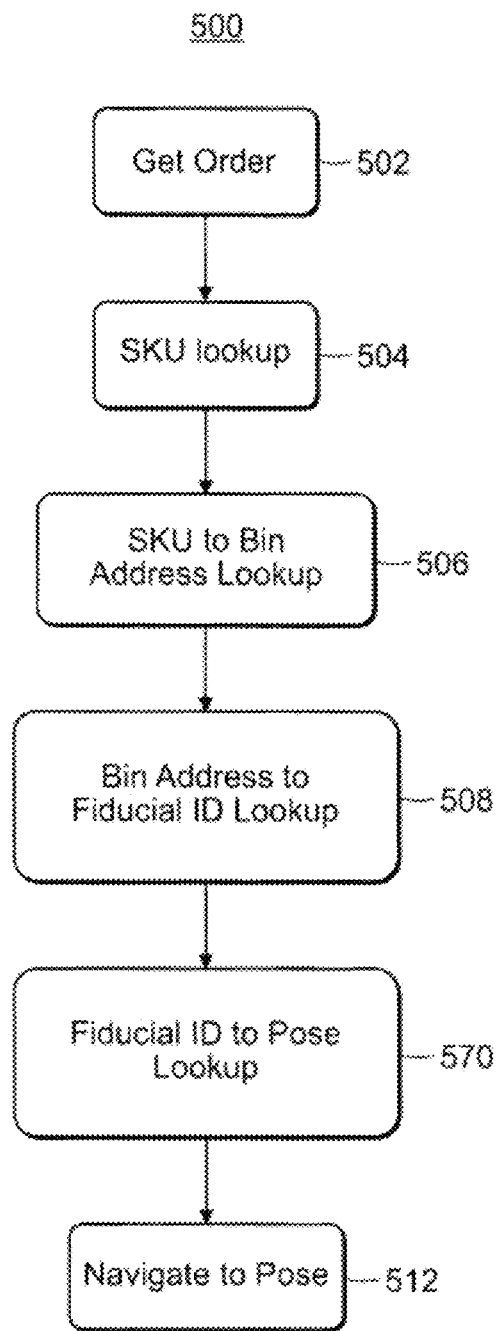
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 22, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

Generally, localization of the robot within warehouse 10a is achieved by many-to-many multiresolution scan matching (M3RSM) operating on the SLAM virtual map. Compared to brute force methods, M3RSM dramatically reduces the computational time for a robot to perform SLAM loop closure and scan matching, two critical steps in determining robot pose and position. Robot localization is further improved by minimizing the M3 SRM search space according to methods disclosed in related U.S. application Ser. No. 15/712,222, entitled Multi-Resolution Scan Matching with Exclusion Zones, filed on Sep. 22, 2017 and incorporated by reference in its entirety herein.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Generally, navigation in the presence of other robots and moving obstacles in the warehouse is achieved by collision avoidance methods including the dynamic window approach (DWA) and optimal reciprocal collision avoidance (ORCA). DWA computes among feasible robot motion trajectories an incremental movement that avoids collisions with obstacles and favors the desired path to the target fiducial marker. ORCA optimally avoids collisions with other moving robots without requiring communication with the other robot(s). Navigation proceeds as a series of incremental movements along trajectories computed at the approximately 50 ms update intervals. Collision avoidance may be further improved by techniques described in related U.S. application Ser. No. 15/712,256, entitled Dynamic Window Approach Using Optimal Reciprocal Collision Avoidance Cost-Critic, filed on Sep. 22, 2017 and incorporated by reference in its entirety herein.

Referring now to FIGS. 9 to 14, the robot induction process according to an aspect of this invention is described. An induction station 600, FIG. 9, attended by an operator 602 is shown with a robot 604 positioned for induction. Robot 604 has navigated to the pose (x,y coordinate) associated with induction station 600, in the manner described above, in order to be "inducted" or assigned an order or order set to "pick" in the warehouse.

During induction, there are four process steps that may be undertaken by the WMS or the order server (these terms may be used interchangeably herein) in near real-time. These steps include: 1) identifying the operator who will induct the robot; 2) recommending a tote/tote array type for the operator to select based on the orders in the order queue; 3) associating a tote selected by the operator with the robot; and 4) assigning an order group/set from the order queue to the robot. These steps will be discussed in turn below.

Operator Identification

In the first step of induction, a tote inductor (e.g. operator/associate 602) may be identified via a near-field Bluetooth RFID badge, e.g. badge 603, so that the WMS knows which operator is about to induct the next robot, i.e. robot 604. Of course, other ways of identifying the operator may be employed, including blue tooth low energy beacons, or via manual login to the WMS via computer 606. In a preferred embodiment, computer 606 has an integrated or stand-alone proximity sensor, such as Bluetooth RFID badge reader 612 which senses the badge 603 of operator 602 when operator 602 enters a zone 614 at induction station 600 proximate computer 606 and the robot 604 being inducted. The size of zone 614 may vary depending on the particular implementation, but may typically be approximately one to two meters in diameter centered on the location of computer 606 or badge reader 612. It should be noted that in place of computer 606 an operator may use any suitable handheld device, including a tablet or a smart phone.

When the operator 602 enters zone 614, the badge reader 612 reads badge 603 worn by the local operator 602 and the computer 606 then communicates information concerning the badge 603 to the WMS. The WMS may then retrieve data about the operator associated with the badge information. The data may include operator preferences for interacting with the WMS via computer 606 (or via a handheld device), such as language preferences and the like. The WMS may also track operator activity and maintain statistics on operator performance. When operator 602 leaves the zone 614, the WMS indicates that this operator is no longer operating as a tote inductor at station 600 and can terminate that operator's induction session. If another operator subsequently enters zone 614 (or operator 602 re-enters zone 614), that operator is identified as a tote inductor for station 600 and a new induction session begins.

Tote Type Recommendation

In the second step of the induction process, a specific tote type (e.g. single tote or a tote array having multiple compartments) may be recommended based on the best available order or set of orders in the order pool of the WMS. An exemplary process for grouping the orders into order sets or groups and identifying a tote type to recommend to the operator is described in more detail below. The tote type may be displayed for the operator on the display of computer 606 or on the display of a handheld device, for example. On the display may be a name/description of the tote type recommended and/or an image of the recommended tote type.

Shown on induction station 600 are examples of two types of tote arrays, namely, tote array 608, which includes two compartments and is capable of handling two orders in an order set and tote array 610, which includes four compartments and is capable of handling four orders in an order set. Examples of several tote types, as may be displayed on computer 606, are depicted in FIG. 10A-10F.

Figure 10B:
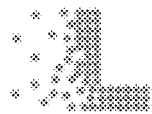
FIG. 10B is a display of a another configuration of a single tote displayed on the operator display screen.
Figure 10B:
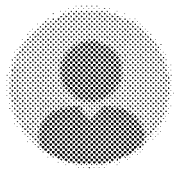
Figure 10B:
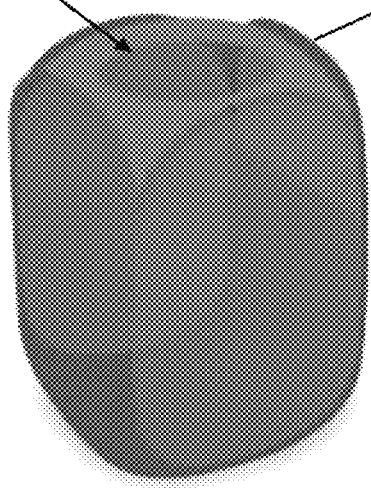
Figure 10B:
Figure 10B:
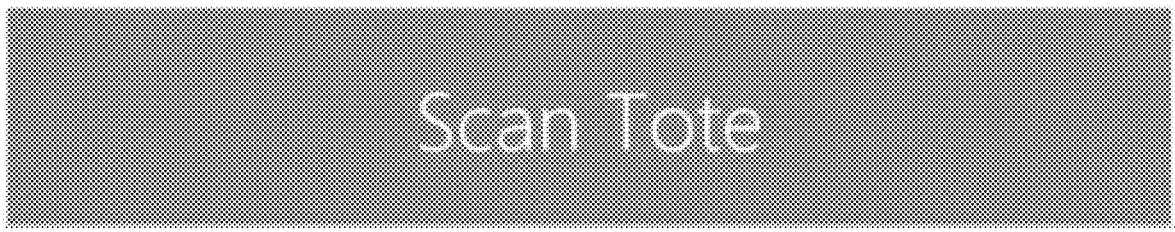

In FIG. 10A there is shown a single tote 620 which is in the form of a rectangular, container with a completely open top 621. The height of tote 620 is less than its length and nearly the same as its width. This tote may be used for a single order with one larger item or a number of smaller items, which together need a larger volume container. Tote 622 of FIG. 10B is also a single tote, which may be used for a single order. It has a smaller, circular opening 623 in the top, so this tote it is more well suited for a single taller/longer and thinner items.

Figure 10E:
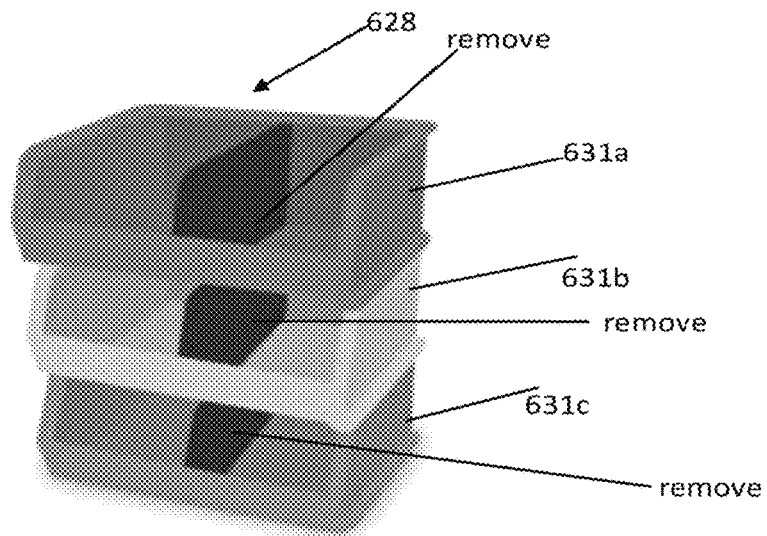
FIG. 10E is a display of three position tote array displayed on the operator display screen.
Figure 10F:
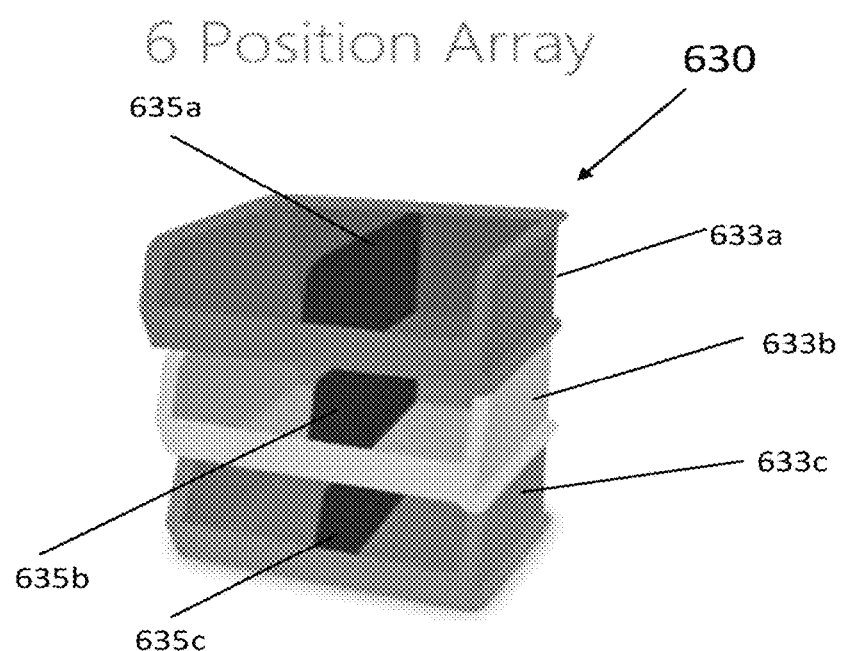
FIG. 10F is a display of six position tote array displayed on the operator display screen.

Tote array 624, FIG. 10C, is a two position array formed of two containers 625a, and 625b having front/side openings through which picked items may be placed. This array is suitable for a two order set, with the items from each order being placed in one of the two containers 625a, and 625b. Tote array 628, FIG. 10D, is a four position array also formed of two containers 627a and 627b having front/side opening through which picked items can be placed. This array also includes dividers 629a and 629b, which divide each of containers 627a and 627b, respectively, into two compartments. Thus, this array is suitable for a four order set, with the items from each order being placed in each of the four compartments Tote array 628, FIG. 10E, is a three position array formed of three containers 631a, 631b, and 631c having front/side opening through which picked items may be placed. This array is suitable for a three order set, with the items from each order being placed in one of the three containers 631a, 631b, and 631c. Tote array 630, FIG. 10F, is a six position array also formed of three containers 633a, 633b, and 633c having front/side opening through which picked items can be placed. This array also includes dividers 635a, 635b, and 635c, which divide each of containers 633a, 633b, and 633c, respectively, into three compartments. Thus, this array is suitable for a six order set, with the items from each order being placed in each of the six compartments.

The above described totes/containers may have any desire dimensions and volumes depending on the types of items that are to be carried.

Referring now to FIG. 11, a table 650 including the tote types available for an operator to select for induction and certain physical characteristics about the different tote types may be saved in memory. The physical characteristics may include the tote number or identifier (column 652), the tote type (column 654), the dimensions (height, width and length) of each of the compartments and/or the opening (column 656) and the volume of each of the compartments (column 658). Some or all of these characteristics may be included in table 650 and additional characteristics may be included.

Figure 12:
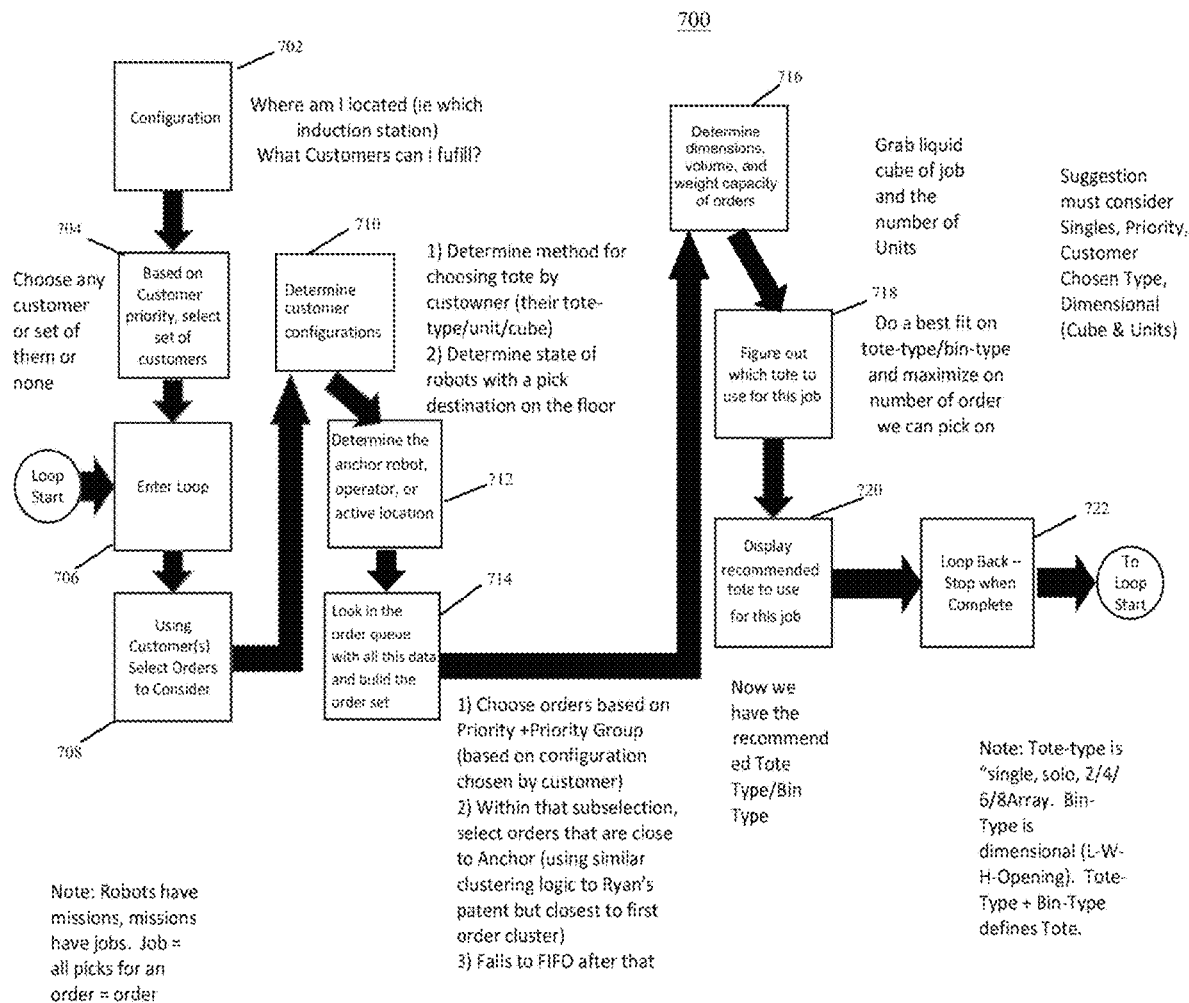
FIG. 12 flow chart depicting the method of recommending the tote-type to suggest to an operator to use for inducting a robot according to an aspect of this invention.

Referring to FIG. 12, there is shown a flow chart 700 describing the tote recommendation process according to an aspect of this invention. As described above, with regard to FIG. 9, a robot navigates to station 600 to be inducted. At step 702, the system assesses the configuration of station 600. Induction stations may have restrictions and be configured to assign orders from only one or several specified retailers shipping products from the warehouse. Alternatively, the station may have no restrictions and be able to assign orders from any retailer.

In step 704, it is determined if any of the retailers that can be assigned from the induction station have priority levels relative to the other retailers. In other words, based on the warehouse operator's contracts with the retailers, certain retailers may have higher priority than others. If there are no retailer priority levels to adjust for, then orders from all retailers available for the induction station may be considered equally rather than selecting certain retailer orders over others based on priority. At step 706 the tote recommendation process begins and at step 708 orders from the order queue from the retailers available, as determined in step 704, are organized based on the retailer priorities, if any. If there are no restrictions on retailers and no retailers with priority levels, the order queue may be organized, for example, by age of order, with the oldest orders at the top of the queue.

At step 710, it is determined if the available retailers for the induction station have one or more specified tote-type(s), i.e. tote type/number of compartments, volume or cube of compartments, which they require. If they do, then the system will select for recommendation only from the preferred tote types. If they do not, then the system may select from any of the available tote types.

In step 712, a robot, which is already deployed in the warehouse, is selected to be a so-called "anchor robot" around which to build an order set. An anchor robot is selected in order to build an order set in a particular area of the warehouse, for example, where there is a higher level of picking activity. By assigning to the robot being inducted an order set in near the location of the anchor robot, it is more likely that there will be operators in the area to quickly service the robot and increase the efficiency of the picking process for the robot.

Alternatively, an anchor operator may be selected and the order set may be built around the location of the anchor operator. The anchor operator may be selected to build an order set in a particular area of the warehouse, also where there is a higher level of picking activity. Yet another alternative is to select a location about which to build an order set based on an area in the warehouse where a number of items to be picked have already been assigned to robots. This provides an indication of upcoming robot/operator activity. Each item to be picked is associated with a location or pose in the warehouse and such locations may be referred to as active locations. One such active location may be designated an anchor active location. It should be noted that the poses for active locations are the locations associated with the fiducial marker/two-dimensional barcode corresponding to the items assigned to be picked, as described above.

Figure 13:
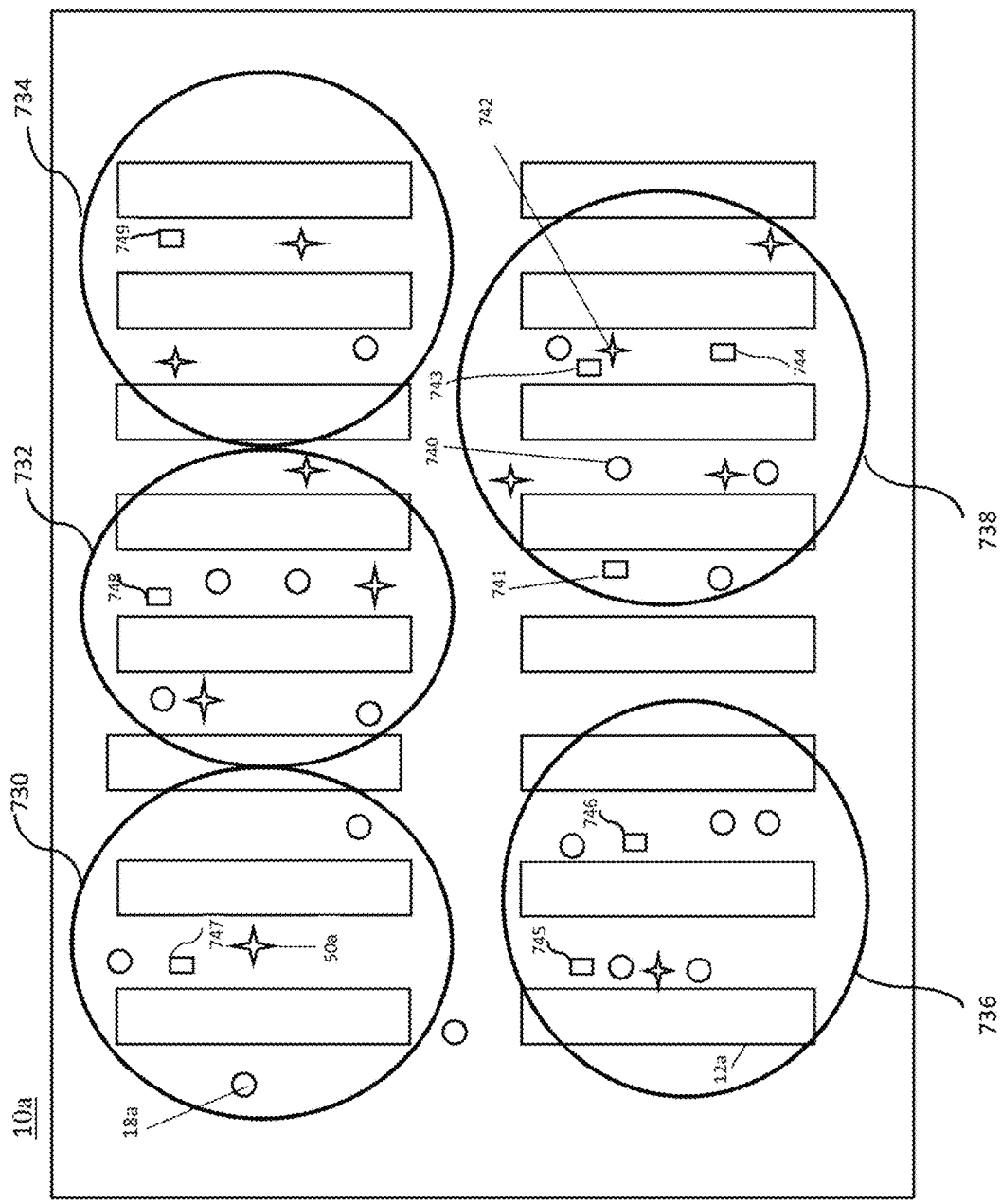
FIG. 13 is a top plan view of a portion of an order-fulfillment warehouse depicting the locations of robots and operators deployed in the warehouse.

Referring to FIG. 13, a portion of a typical order-fulfillment warehouse 10a includes shelves, e.g. shelf 12a, filled with the various items that could be included in an order and a plurality of robots, e.g. 18a, deployed in the warehouse to execute orders, for example, pick orders. Also shown are a number of operators, e.g. 50a, dispersed throughout the warehouse to service robots in picking items from the shelves. According to an aspect of this invention, the robots which are deployed to pick orders and/or operators within the warehouse may be grouped according to their locations in the warehouse. Alternatively, the locations (poses) of items in the warehouse which have been assigned to robots, but which have not yet been picked (so called "active locations") may be identified and grouped. Using one or more of these groupings the anchor robot, anchor operator, or anchor active location may be selected.

An example of the grouping process is shown in FIG. 13 to include five groups, namely, groups 730, 732, 734, 736, and 738. The groups may be selected in various ways, including, for example, by looking for clusters of robots/operators/active locations and encompassing them with a circle of a predefined radius. Or, predefined areas within the warehouse may be used to establish the groups. For example, the warehouse may be divided into four equal-sized regions, each of which would constitute a group. Either way, once the groups are set, a group may be selected as the anchor group and one of the robots, operators, or active locations in the anchor group may be selected as the anchor robot/operator/active location around which to build an order set.

The process for selecting the anchor group may include selecting the group based on robot/operator/active location factors within the group. The factors may be population or ratios or a combination of both. This may be done in various ways, including selecting the region with the highest robot/operator/active location density (i.e. number of robots/operators/active locations over the area of each grouping, if the area of the groups differ in size) or the region with the greatest number of robots/operators/active locations when the groups are all of the same size. For example, group 738 may be chosen as the anchor group, as it has the highest number of robots, operators, and active locations (eleven) as compared to the other groups.

Alternatively, the anchor group may be the group with the highest number of robots, such as group 736, with five robots, or the group with the highest number of operators, which is also group 738 with four operators, may be selected. The anchor group may also be selected based on the operator to robot ratio or a combination of robot/operator density and on operator to robot ratio. Another way to select the anchor group may be by assessing the number of active locations within the groups. Active locations 741, 743 and 744 are shown in 738. In group 736 there are two active locations, namely 745 and 746. In groups 730, 732, and 734 there are only one active location in each, namely, active locations 747, 748, and 749. Thus, if the anchor group were being selected based on active location population, the group 738 would again be selected.

The goal is to select a group with a high level of activity so that the chances of executing the orders by the robot being inducted quickly and efficiently will be increased. For this example, assume that group 738 has been selected as the anchor group. An anchor robot, operator, or active location may be selected and its known location (the anchor location) may be used to select and group orders to be assigned to the robot. Any robot/operator/active location in the group may be used as the anchor, but it will be preferable to select one near the center of the anchor group. In this case robot 740 may be selected as the anchor robot. Alternatively, an anchor operator may be selected, such as anchor operator 742, or an anchor active location such as active location 743.

Referring again to flow chart 700 of FIG. 12, with the order queue organized from step 708, retailer configuration information from step 710, and the anchor robot/anchor order/anchor active location selected, and from that an anchor location known, as determined in step 712, an order set can be established in step 714. In general, any method for grouping orders into order sets may be used, including, for example, a first in first out ("FIFO") approach. However, having an anchor location which has been determined to be in an active area of the warehouse, establishing a set of orders which are in proximity to the anchor location is a desirable approach as it will improve overall pick efficiency. One approach for grouping orders into order sets based on "likeness" (i.e. proximity to each other) which may be used, is described in co-pending U.S. patent application Ser. No. 15/807,672, entitled Order Grouping in Warehouse Order Fulfillment Operations, filed on Sep. 1, 2016. This application is incorporated herein by reference in its entirety.

The order grouping process described in the above mentioned patent application provides an opportunity to cluster or group "like" orders together to reduce the amount of travel required for the robot to execute an order set. Orders may be determined to be "like" each other if, for example, the individual items or "picks" of the orders are located near each other within the warehouse. In grouping like orders for assignment to a robot, the robot will travel less distance to fulfill the orders and therefore increase pick rates and overall efficiency/productivity of the warehouse operation.

Typical warehouse management systems do not contain information about the physical locations in the warehouse of the items stored therein. The order grouping process according to an aspect of this invention and as described in co-pending U.S. patent application Ser. No. 15/807,672, has knowledge of the locations (x, y coordinates) of all of the items stored within the warehouse. This order grouping process is described as follows Referring to FIG. 14 there is shown a portion of a sample order queue 750 established from step 714 of FIG. 12 which is sorted based on proximity to the anchor location, as described below. The order queue includes a listing of orders (column 752) queued for assignment to a robot for execution. For each order in column 752 there are three sets of columns 754, 756, and 758, which include coordinates $(x_1,y_1)$, $(x_2,y_2)$, and $(x_3,y_3)$. These coordinates correspond to the midpoints of cluster regions. The cluster regions are formed by plotting the locations of items on the coordinate graph and grouping them into clusters of one or more items that are close in proximity to each other.

Once the order queue is populated with midpoints for the cluster regions in each order, the system may then use the order queue to group "like" orders together and assign them for execution. In other words, the order queue may be arranged based on a likeness scoring system described in detail in co-pending U.S. patent application Ser. No. 15/807, 672, which assigns a score based on a calculated distance from a location. In this case, that location is the anchor location. The order at the top of the queue, which in the example of queue 750, is order 760, and it may be designated the "anchor order", meaning it is the order closest to the anchor location as it has the lowest score, i.e. "5".

Column 780 in order queue 750 contains the likeness score for each order relative the anchor location. The order queue is sorted in ascending order by likeness score for each of the orders or portion thereof for grouping with the anchor order for assignment to the robot being inducted. The scoring for the orders relative to the anchor location/anchor order, ranges from 11 to 226, which indicates how "like" the other orders are to the anchor order and hence to the anchor location. Likeness may be defined as how close in proximity each order is to the anchor order and the anchor location (the lower the number the closer). Once the order queue is organized according to likeness, orders may be grouped into order sets, such as order set 782, which, in this example, is a three order set.

The number of orders to group to form an order set may be determined in various ways, including setting it according to the tote types that are available for use. Or, the system may always try to use the tote with the greatest number of compartments, e.g. six compartments, and group orders that way (i.e. 6 orders for each order set). Alternatively, it may group based on the most common tote type available, e.g. a three compartment tote, as was the case in the above example where a three order set is established. The number of orders may be grouped based on their likeness or proximity to each other. In other words, referring to table 750, the base order may be grouped with orders with a likeness of "20" or less which, in that example, would result in the grouping of the first four orders in the order set instead of three. Of course, this assumes that a tote type with the designated number of compartments is available.

Regardless the approach used for ordering the queue and selecting an order set, each order in the queue may contain information about characteristics of the order which may be used in the recommendation of a tote-type. The characteristics of the orders may include dimensions (H, W, or L) of the items in the order, as shown in column 784 and in column 786 the volumes or cubes of the item(s) in each order. The characteristics may be defined as aggregate amounts, i.e. the total volume/cube of all items in the order. For dimensions, the greatest value for each dimension (x, y, z) for all the items in an order may be used. As will be described below, this information may help in selecting the appropriate tote type for the order set, so as to ensure that all items in an order set may fit in a selected tote type.

Referring again to FIG. 12, in step 716, one or both of the dimensions or volume of each order in the order set may be determined and in step 718 a best fit analysis is performed to determine the tote type of the available totes (e.g. totes types saved in memory as shown in FIG. 11) which will best fit the order set. In the example of order set 782, one or both of the dimensions and/or volume of the orders are compared to the dimensions/volume of the available tote type(s) with three compartments, as order set 782 has three orders, each having its own compartment. If there is only one tote type with the requisite number of compartments, an analysis would still be made to ensure that the orders will fit in that tote array. If there are multiple tote-types with the requisite number of compartments, the analysis would be made and a tote type may be selected based on desired criteria, such as, closest fit or most extra capacity. If there are no tote-types with the required capacity, the order queue may be re-organized or the order set may be re-established from different orders in the existing order queue and then the same tote-type best fit analysis would be re-performed.

Figure 9:
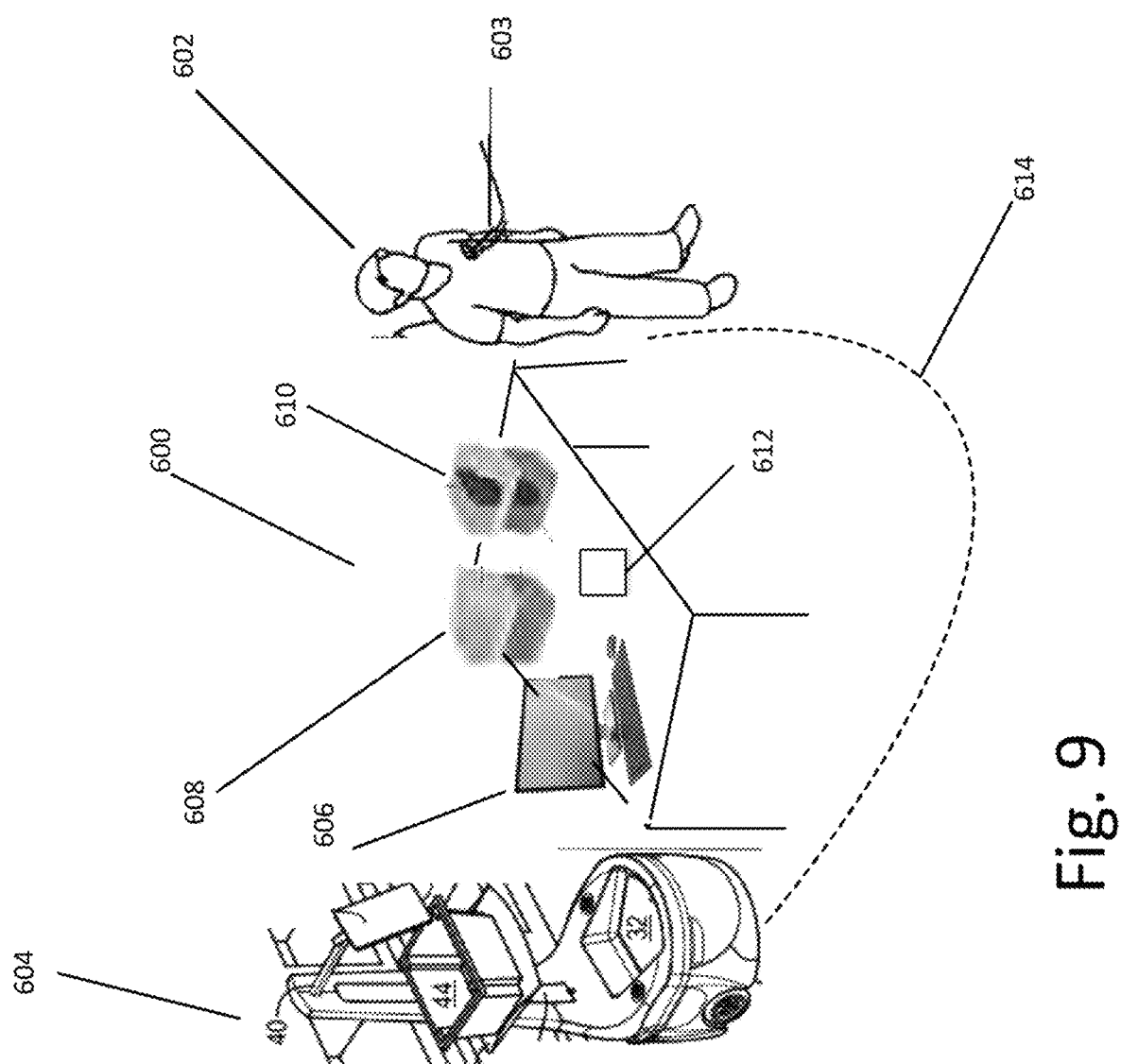
FIG. 9 is perspective view of a robot and operator at an induction station.

Once the best fit analysis is performed and a tote-type is determined, in step 720 an image or description of the best fit tote-type may be displayed to operator 602, FIG. 9, as the recommended tote type. In step 722, the system loops back to step 706 to begin the process again for the next order set for the next robot.

In an alternative embodiment, steps 714, 716, and 718 of flow chart 700, FIG. 12, may be collapsed into a single step by constructing a query with a number of desired parameters to be run against the order queue, taking into account the then current availability of tote arrays. For example, the system may be configured to default to the highest density tote array available (i.e. the tote array with the greatest number of compartments), and then a query based on customer priority (as determined by service level agreement), likeness/proximity of the orders to the anchor location, and fit (dimensions and/or volume) to the compartments of the known highest density tote array.

Using the above described type of query an order set having a plurality of orders equal to the number of compartments in the highest density available tote array will be retrieved based on highest customer priority, proximity to the anchor location and fit to the compartment size of the tote array. As an example, with a six compartment tote array with compartments having a certain volume (i.e. liquid cube), the query would return a set of six orders, based first on customer priority and next on likeness (proximity to anchor location), each having an aggregate volume (sum of volumes of each item in the order) which fits in the volume of the compartments in the tote array.

Associating Tote Selected to Robot

Subsequent to the tote type recommendation, the operator will select a tote/tote array and scan the bar code on the tote/tote array. This process may be implemented in the manner described in U.S. patent application Ser. No. 15/254, 321, entitled Item Storage Array for Mobile Base in Robot Assisted Order-Fulfillment Operations, filed on Sep. 1, 2016, and incorporated herein by reference in its entirety. Once scanned, the WMS associates or assigns the selected tote/tote array to robot 604 for the current pick process for which the robot is being inducted. From the bar code, the WMS is able to retrieve information about the selected tote/tote array to determine if it matches the recommended tote type. Preferably the tote type recommended to the operator is the tote type selected, but it will not always be for various reasons. The final step of assigning the order set to the robot is undertaken as described below.

Assigning an Order Set to Robot

From the bar code, the WMS knows the selected tote/tote array type that has been associated with/assigned to the robot being inducted. The system determines if the selected tote type matches the recommended tote type and if it does then the order set determined in step 714 of flow chart 700, FIG. 12, is used and assigned to the robot. The induction process is complete and the robot leaves the induction station to fulfill the assigned order set.

Figure 15:
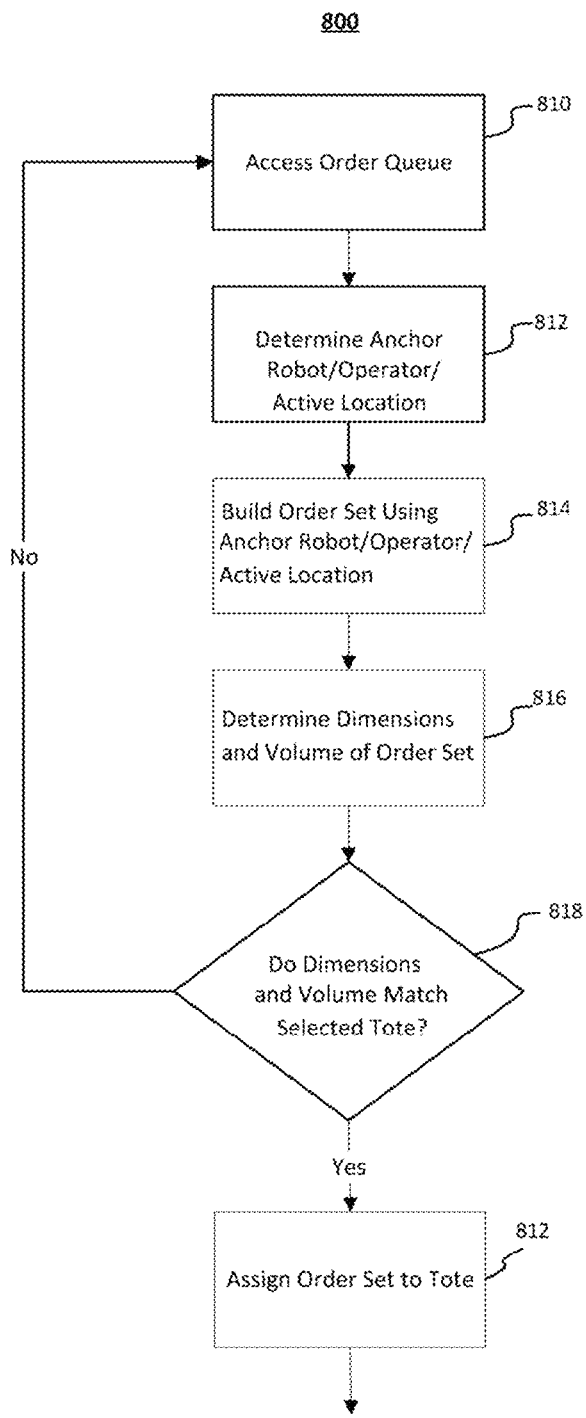
FIG. 15 is flow diagram of a process of inducting a robot if the operator has not selected the recommended tote type according to the flow chart of FIG. 12.

If the system determines that the selected tote type that has been associated with/assigned to the robot being inducted does not match the recommended tote type, a new order set must be generated for the selected tote type using flow chart 800, FIG. 15, which is a subset of the steps of flow chart 700, FIG. 12.

From the process described in flow chart 700, the system has already assessed the configuration of station 600 and is aware of any restrictions, e.g., whether there are only certain retailers to which the induction station is dedicated or whether there are retailers with priority levels that must be considered. Based on this, in step 810, FIG. 15, the order queue which has already been organized/sorted may be accessed and used again to assign an order set based on the actual tote type selected by the operator. Or, the order queue may be reorganized/re-sorted using the same criteria and the re-sorted order queue may be accessed in step 810.

In step 812, using a robot which is already deployed in the warehouse, an anchor robot around which an order set may be built, is selected. Alternatively, an anchor operator or anchor active location may be selected and the order set may be built around the anchor operator or the anchor active location. In step 814, using the anchor robot/operator/active location, the order set may be built. These process steps are described above with regard to flow chart 700.

In step 816, one or more of the dimensions, volume or weight capacity of each order in the order set are determined and in step 818 the order set dimensions are compared to the dimensions of the tote type selected by the operator (see totes types saved in memory as shown in FIG. 11) to determine if it will be able to accommodate the items in the order set. If the tote type can accommodate the order set, the order set is assigned to the robot at step 820. If the tote type selected cannot accommodate the order set, the system returns to step 810 and begins the process again by reordering the queue and/or selected a different anchor robot.

Non-Limiting Computing Device Examples

Figure 16:
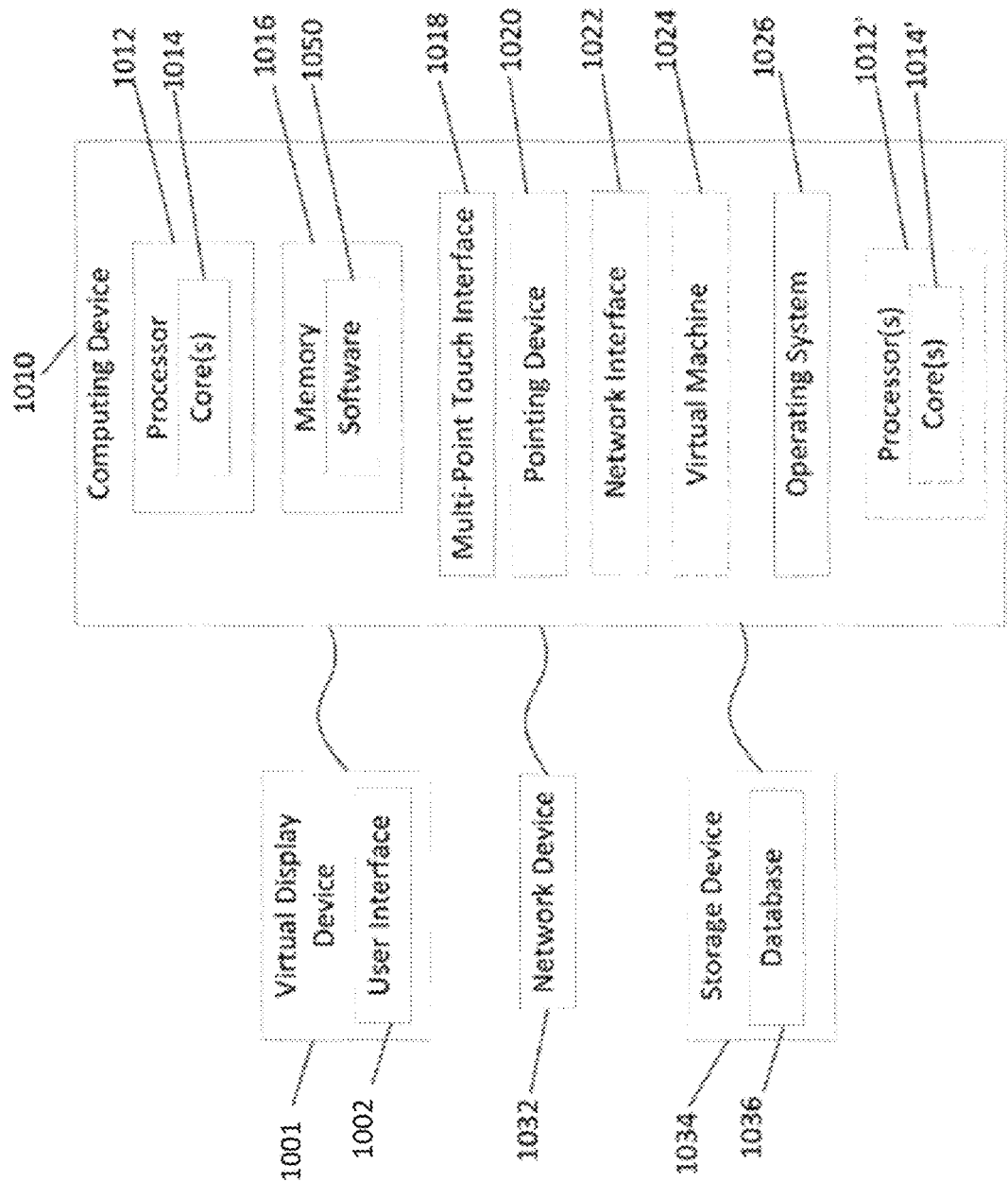
FIG. 16 is a block diagram of an exemplary computing system.

FIG. 16 is a block diagram of an exemplary computing device 1010 such as can be used, or portions thereof, in accordance with various embodiments as described above with reference to FIGS. 1-15. The computing device 1010 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1016 included in the computing device 1010 can store computer-readable and computer-executable instructions or software for performing the operations disclosed herein. For example, the memory can store software application 1040 which is programmed to perform various of the disclosed operations as discussed with respect to FIGS. 1-15. The computing device 1010 can also include configurable and/or programmable processor 1012 and associated core 1014, and optionally, one or more additional configurable and/or programmable processing devices, e.g., processor(s) 1012' and associated core (s) 1014' (for example, in the case of computational devices having multiple processors/cores), for executing computer-readable and computer-executable instructions or software stored in the memory 1016 and other programs for controlling system hardware. Processor 1012 and processor(s) 1012' can each be a single core processor or multiple core (1014 and 1014') processor.

Virtualization can be employed in the computing device 1010 so that infrastructure and resources in the computing device can be shared dynamically. A virtual machine 1024 can be provided to handle a process running on multiple processors so that the process appears to be using only one computing resource rather than multiple computing resources. Multiple virtual machines can also be used with one processor.

Memory 1016 can include a computational device memory or random access memory, such as but not limited to DRAM, SRAM, EDO RAM, and the like. Memory 1016 can include other types of memory as well, or combinations thereof.

A user can interact with the computing device 1010 through a visual display device 1001, 111A-D, such as a computer monitor, which can display one or more user interfaces 1002 that can be provided in accordance with exemplary embodiments. The computing device 1010 can include other I/O devices for receiving input from a user, for example, a keyboard or any suitable multi-point touch interface 1018, a pointing device 1020 (e.g., a mouse). The keyboard 1018 and the pointing device 1020 can be coupled to the visual display device 1001. The computing device 1010 can include other suitable conventional I/O peripherals.

The computing device 1010 can also include one or more storage devices 1034, such as but not limited to a hard-drive, CD-ROM, or other computer readable media, for storing data and computer-readable instructions and/or software that perform operations disclosed herein. Exemplary storage device 1034 can also store one or more databases for storing any suitable information required to implement exemplary embodiments. The databases can be updated manually or automatically at any suitable time to add, delete, and/or update one or more items in the databases.

The computing device 1010 can include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1022 can include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 can run any operating system 1026, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1026 can be run in native mode or emulated mode. In an exemplary embodiment, the operating system 1026 can be run on one or more cloud machine instances.

Figure 17:
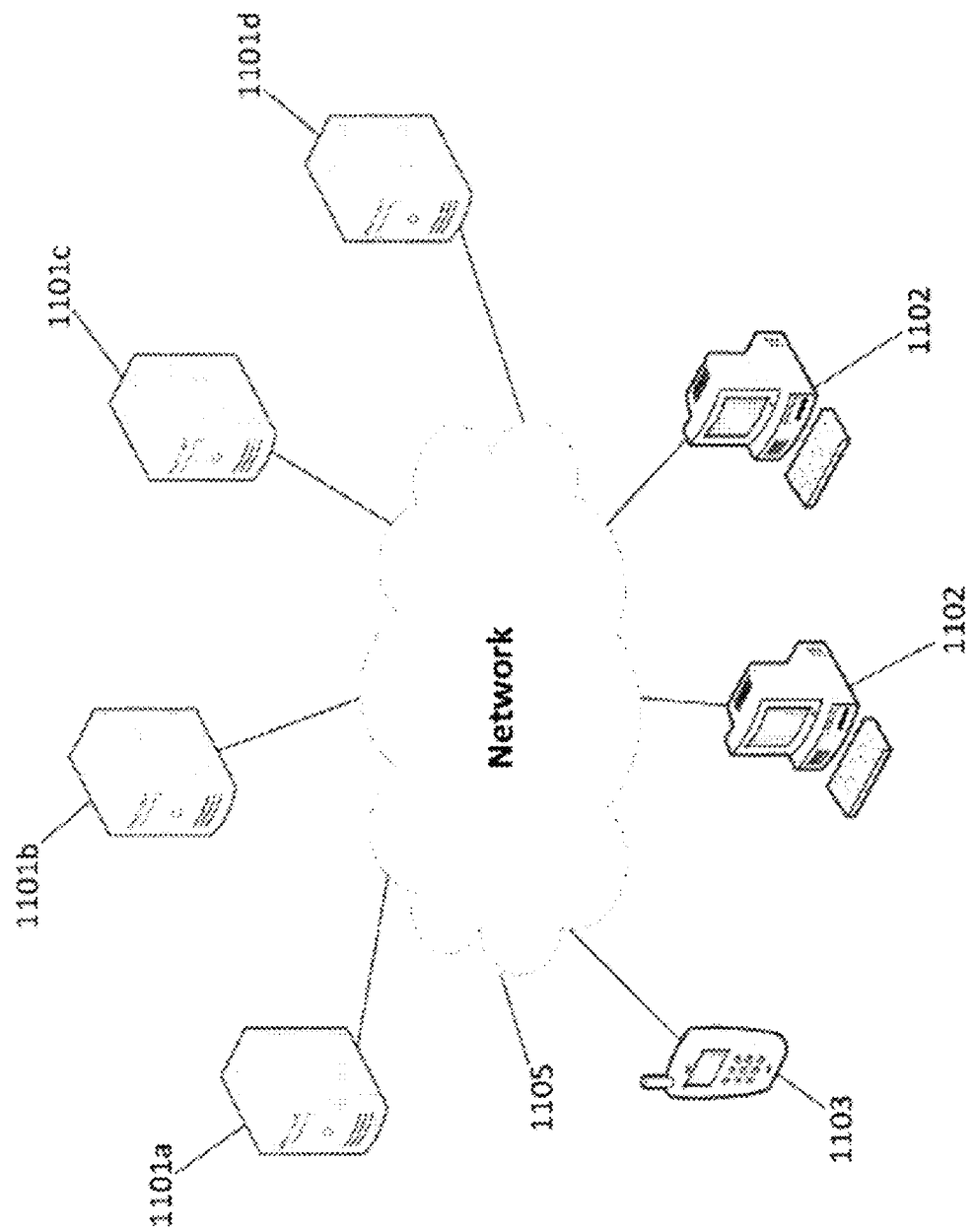
FIG. 17 is a network diagram of an exemplary distributed network.

FIG. 17 is an example computational device block diagram of certain distributed embodiments. Although FIGS. 1-15, and portions of the exemplary discussion above, make reference to a warehouse management system 15, an order-server 14, and a zone server each operating on an individual or common computing device, one will recognize that any one of the warehouse management system 15, the order-server 14, an/or the zone server may instead be distributed across a network 1105 in separate server systems 1101a-d and possibly in user systems, such as kiosk, desktop computer device 1102, or mobile computer device 1103. For example, the order-server 14 and/or the zone server may be distributed amongst the tablets 48 of the robots 18. In some distributed systems, modules of any one or more of the warehouse management system software, the order-server software, and the zone engine can be separately located on server systems 1101a-d and can be in communication with one another across the network 1105.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

We claim:

1. A method for assigning orders by a computer system to a plurality of robots fulfilling orders in a warehouse with the assistance of a plurality of operators, each order including one or more items and each item stored at an item location in the warehouse, the method comprising:
    selecting, by a computer processor, an order set from a plurality of orders stored in a computer memory to be assigned to a first robot of the plurality of robots, the order set including one or more orders of the plurality of orders; the step of selecting including operating the computer processor to:
        form a plurality of groups in the warehouse, each group defining a region in the warehouse and each group including one or more robots and/or operators;
        select one of the plurality of groups as an anchor group based on a level of activity in the applicable region in the warehouse;
        assign a location within the region of the anchor group as an anchor location; and
        generate the order set for the first robot based in part on proximity of the one or more orders in the order set to the anchor location; and
    assigning the order set to the first robot for fulfillment.

2. The method of claim 1 further including positioning the first robot at a processing station where an operator assists with assigning the order set to the first robot.

3. The method of claim 2 wherein the operator provides the first robot with a tote array for carrying the items in the order set when the first robot fulfills the order set in the warehouse.

4. The method of claim 3 wherein the first robot fulfills the order set in the warehouse by travelling to item locations in the warehouse associated with each item in the order set and communicating to an operator proximate each item location the item to be selected and placed on the tote array of the first robot.

5. The method of claim 1 wherein one or more of the plurality of groups includes one or more active locations in the warehouse, wherein each of active locations is an item location associated with an item in an order that has been assigned to one of the plurality of robots for fulfillment.

6. The method of claim 5 wherein operating the computer processor to assign the anchor location the includes identifying one of the robots, operators, or active locations in the anchor group as the anchor robot, anchor operator or anchor active location and using the location of the selected anchor robot, anchor operator or anchor active location as the anchor location.

7. The method of claim 5 wherein selecting the anchor group includes selecting the group based on the number of robots, operators, and/or active locations; and wherein the number of robots, operators, and/or active locations defines the level of activity in the group.

8. The method of claim 5 wherein the step of selecting the anchor group includes selecting the group based on a ratio of one of robots, operators, and active locations to another of robots, operators, and active locations; and wherein the ratio of one of robots, operators, and active locations to another of robots, operators, and active locations defines the level of activity in the group.

9. A system for assigning orders to a plurality of robots fulfilling orders in a warehouse with the assistance of a plurality of operators, each order including one or more items and each item stored at an item location in the warehouse, the system comprising:
a first robot of the plurality of robots to be assigned an order set from a plurality of orders, the order set including one or more orders to be fulfilled; and
a warehouse management system configured to:
form a plurality of groups in the warehouse, each group defining a region in the warehouse and each group including one or more robots and/or operators;
select one of the plurality of groups as an anchor group based on a level of activity in the applicable region in the warehouse;
assign a location within the region of the anchor group as the anchor location;
generate the order set for the first robot, the order set being based in part on proximity of the one or more orders in the order set to the anchor location in the warehouse; and
assign the order set to the first robot for fulfillment.

10. The system of claim 9 further including a processing station where an operator assists with assigning the order set to the first robot.

11. The system of claim 10 wherein the operator provides the first robot with a tote array for carrying the items in the order set when the first robot fulfills the order set in the warehouse.

12. The system of claim 11 wherein the first robot is configured to fulfill the order set in the warehouse by travelling to item locations in the warehouse associated with each item in the order set and communicating to an operator proximate each item location the item to be selected and placed on the tote array of the first robot.

13. The system of claim 9 wherein one or more of the plurality of groups includes one or more active locations in the warehouse, wherein each of the active locations is an item location associated with an item in an order that has been assigned to one of the plurality of robots for fulfillment.

14. The system of claim 13 wherein the warehouse management system is configured to select from the anchor group one of the robots, operators, or active locations in the anchor group as the anchor robot, anchor operator or anchor active location and use the location of the selected anchor robot, anchor operator or anchor active location as the anchor location.

15. The system of claim 13 wherein the warehouse management system is configured to select the anchor group based on the number of robots, operators, and/or active locations; and wherein the number of robots, operators, and/or active locations defines the level of activity in the group.

16. The system of claim 13 wherein the warehouse management system is configured to select the anchor group based on a ratio of one of robots, operators, and active locations to another of robots, operators, and active locations; and wherein the ratio of one of robots, operators, and active locations to another of robots, operators, and active locations defines the level of activity in the group.

* * * * *